United States Patent [19]

Mosca et al.

[11] 3,843,835

[45] Oct. 22, 1974

[54] OPTICAL SYSTEM FOR TAKING VIDEOTELEPHONE PICTURES AND THE LIKE

[75] Inventors: Virgilio Mosca; Carmelo Solarino, both of Milan, Italy

[73] Assignee: Societa Italiana Telecomunicazioni Siemens S.p.A., Milan, Italy

[22] Filed: Jan. 12, 1973

[21] Appl. No.: 323,270

[30] Foreign Application Priority Data

Jan. 17, 1972 Italy.................................. 19446/72

[52] U.S. Cl. ........ 178/7.92, 178/DIG. 30, 179/2 TV
[51] Int. Cl. .............................................. G02b 7/14
[58] Field of Search............ 178/DIG. 30, 7.92, 7.85, 178/7.89, 2 TV, DIG. 29; 350/286; 200/61.71, 61.73, 61.78, 61.81

[56] References Cited

UNITED STATES PATENTS

| | | | |
|---|---|---|---|
| 1,013,815 | 1/1912 | Richard | 350/286 |
| 2,144,745 | 1/1939 | Soreng | 240/6.4 |
| 2,420,198 | 5/1947 | Rosenthal | 178/6.8 |
| 2,421,476 | 6/1947 | Belar et al. | 95/64 |
| 3,088,021 | 4/1963 | Monahan | 240/2 |
| 3,403,613 | 10/1968 | Huber | 98/39 |
| 3,755,623 | 8/1973 | Cassagne | 178/7.89 |

FOREIGN PATENTS OR APPLICATIONS 248,201  11/1963  Australia........................... 178/7.92

*Primary Examiner*—Howard W. Britton
*Assistant Examiner*—Michael A. Masinick
*Attorney, Agent, or Firm*—Karl F. Ross; Herbert Dubno

[57] ABSTRACT

A television camera, to be used as part of a videotelephone transmitter, includes a stationary objective and a carriage movable in front of that objective transversely to its axis, the carriage supporting a miter prism and a plurality of supplementary lenses alternately alignable with the objective. A supporting surface for documents to be transmitted lies parallel to and spaced from the objective axis so as to confront the base of the miter prism when the latter is in its operative position, the objective then focusing light rays from that surface by way of the prism upon the photocathode of an image tube. In other carriage positions the supplemental lenses extend the front-focal length of the objective in order to enable the taking of pictures of persons and other objects at different distances in front of the camera.

8 Claims, 3 Drawing Figures

OPTICAL SYSTEM FOR TAKING VIDEOTELEPHONE PICTURES AND THE LIKE

FIELD OF THE INVENTION

Our present invention relates to an optical system, specifically a television camera, adapted to be used as a picture transmitter of a videotelephone station or the like.

BACKGROUND OF THE INVENTION

In such transmitters it is frequently necessary to change focus, particularly when the same system is to be used for the facsimile transmission of documents at close range and for the picturing of objects more remote from the camera. The use of an objective with a front-focal length adjustable over such a wide range entails structural difficulties, notably in the presence of a diaphragm which must be moved together with the displaceable optical component or components and which is mechanically coupled with a photoelectric controller or photometer also subject to such displacement; the alternative of holding the diaphragm and its photometer stationary enables accurate light control only in one position of adjustment of the objective.

For the transmission of pictorial matter from papers or other flat documents it is generally necessary to provide a (usually horizontal) supporting surface from which the light rays are reflected by an inclined mirror onto the objective and thence upon a receiving surface of an associated image tube, such as the photocathode of an iconoscope. While the use of such a reflector eliminates the need for changing the attitutde of the objective in switching between transmission of documents and of scenes, its presence causes a lateral reversal of the image with reference not only to the original but also to the transmitted pictures of live objects in front of the camera that are photographed without the reflector.

OBJECTS OF THE INVENTION

The general object of our present invention, therefore, is to provide an optical system of the character set forth which avoids the aforestated inconveniences.

A more specific object is to provide means in such a system for eliminating the relative lateral reversal between pictures of documents, taken via a reflector, and pictures of scenes directly photographed.

SUMMARY OF THE INVENTION

The foregoing objects are realized, in accordance with our present invention, by the provision of a reflector in the form of a miter prism supported on a movable mounting means, such as a slidable carriage, together with one or more supplemental lenses designed to extend the front-focal length of the stationary objective; the prism and the supplemental lens or lenses are alternately alignable with that objective in different operating positions of their movable mounting means. The miter prism has a base and two side faces which meet at a ridge sloping toward the base, this ridge being intersected by an extension of the optical objective axis in that operating position in which the base of the prism confronts the document-supporting surface; the latter surface is parallel to and spaced from the optical axis of the objective, as is the base of the prism at least in the aligned position thereof.

By the use of such a miter prism, as will be shown in detail hereinafter, the light rays coming from a document on a supporting surface are transposed in two orthogonal planes and not just in one as with ordinary mirrors. This double transposition results in a laterally nonreversed image projected upon the photocathode of the iconoscope and electromagnetically communicated to an associated receiving station.

The carriage supporting the prism and the supplemental lenses or lenses may be provided with a handle for manual displacement and, in the position of operative alignment of the prism with the objective, may close a switch for the illumination of the supporting surface by a lamp.

BRIEF DESCRIPTION OF THE DRAWING

The above and other features of our invention will now be described in detail with reference to the accompanying drawing in which.

SPECIFIC DESCRIPTION

Figure 1:
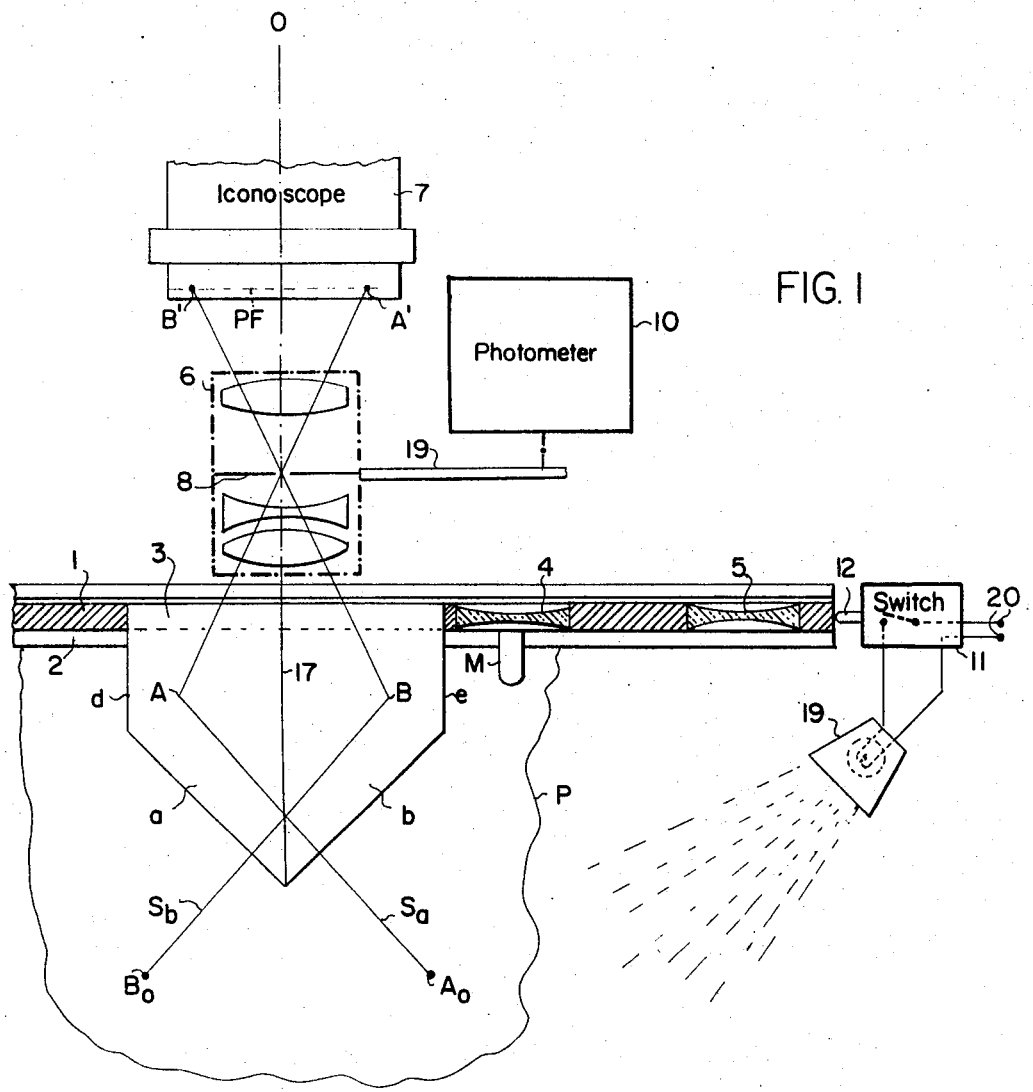
FIG. 1 is a somewhat diagrammatic top plan view (partly in section) of the principal components of a television camera embodying our invention.

The system shown in the drawing forms part of a videotelephone transmitter VID whose housing 18 has a front opening 15 and a bottom opening 16, the latter overlying a rigid plate P which forms a horizontal supporting surface for paper sheets G or other documents bearing pictorial matter to be photographed. A movable carriage 1 inside housing 18 has the form of a flat perforated upright slide horizontally guided between rails 2 and 2', this slide being provided with a handle M for manual displacement. The three perforations of slide 1 accommodate, side by side, a miter prism 3 and two lenses 4 and 5, the latter serving to extend the front-focal length of a fixed objective 6 centered on an axis O. Objective 6 is provided with an iris diaphragm 8 whose aperture is adjustable with the aid of a lever 19, in a manner well known per se and therefore indicated only schematically, by the output of a photometer 10 fixedly positioned in housing 18 for illumination via entrance opening 15. The housing further contains an image tube 7, such as an iconoscope, provided with a photocathode forming a receiving surface PF.

A lamp 19 above supporting surface P is energizable from a current source 20 upon closure of a switch 11 controlled by a pushbutton 12, the latter being depressed by the slide 1 in its extreme right-hand position (as viewed in FIGS. 1 and 2) in which the prism 3 is aligned with front opening 15 and objective 6. The prism has two mutually perpendicular side faces $a$ and $b$ which meet at a ridge 17 sloping at an angle of 45° toward a base $c$, the latter being horizontal and spaced by a distance H of about 35 cm from the supporting surface P. In its operative position shown in the drawing, prism 3 is symmetrical with reference to axis O whose extension intersects the ridge 17 as indicated at X in FIG. 3.

Figure 2:
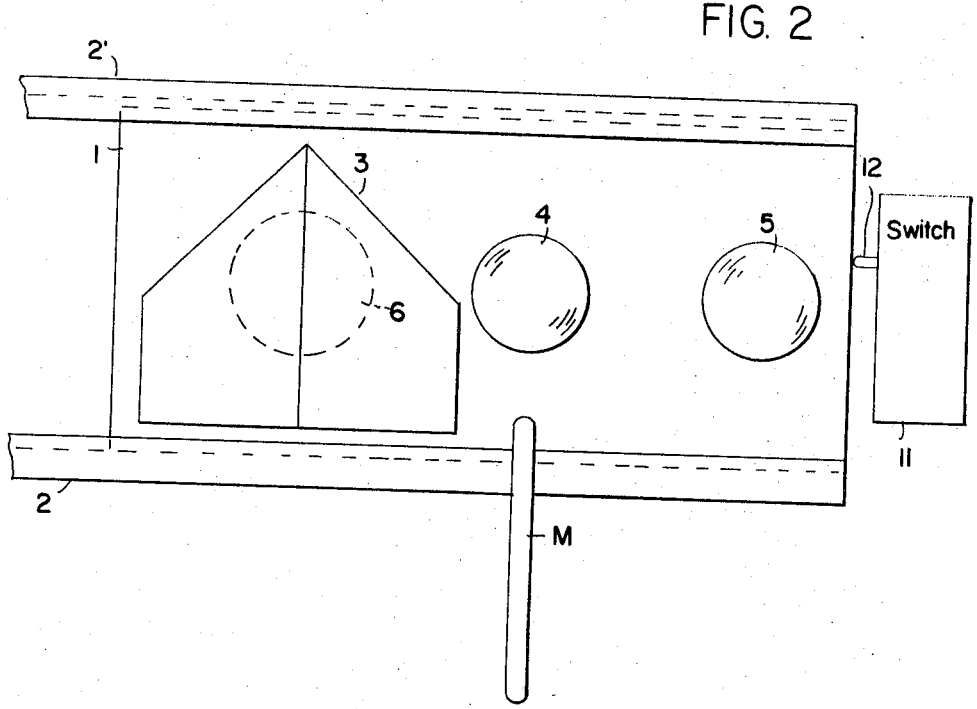
FIG. 2 is a front view of the assembly of FIG. 1.
Figure 3:
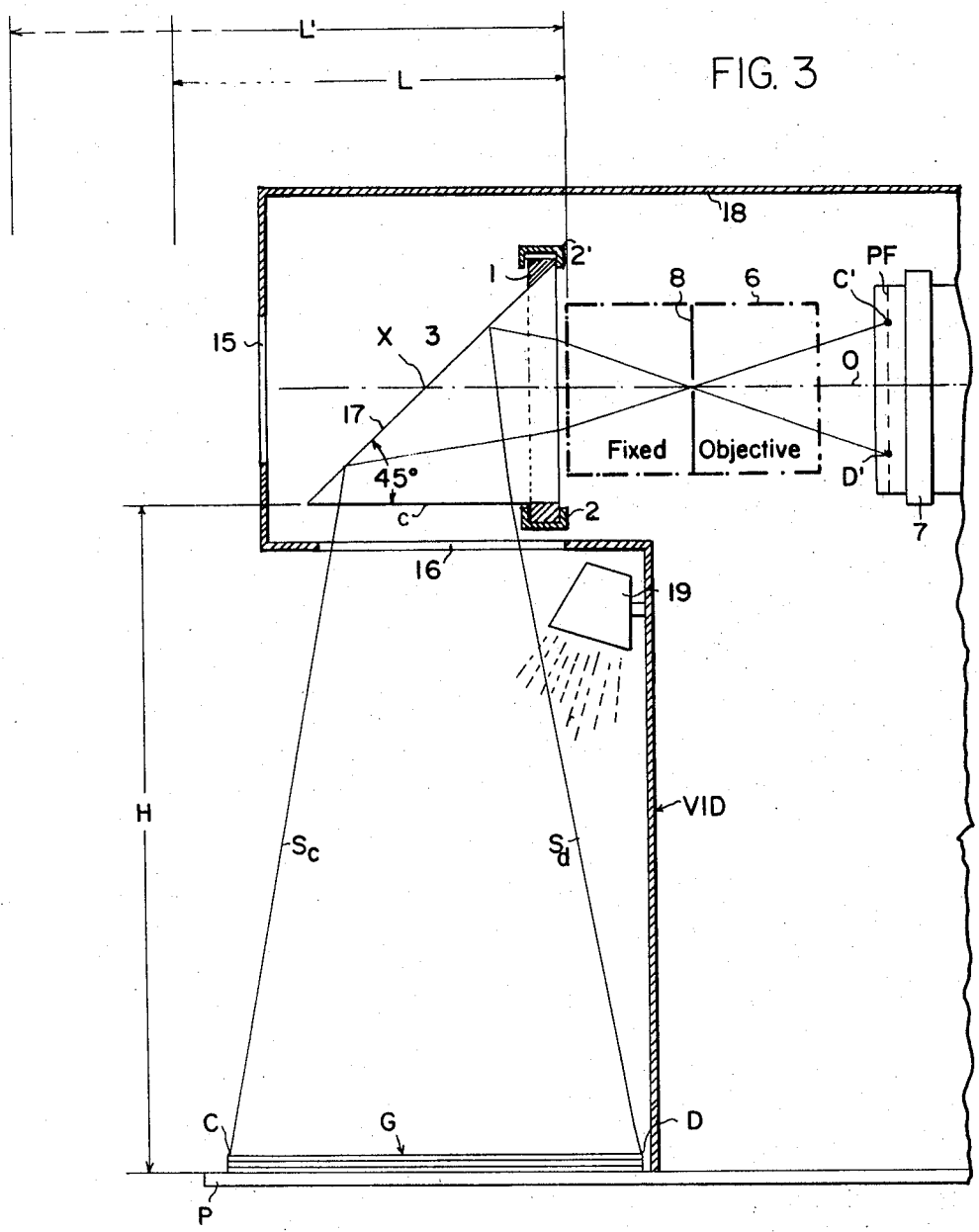
FIG. 3 is a lateral sectional view thereof.

Consider two symmetrically disposed points $A_o$ and $B_o$ on supporting surface P or on a document carried thereby. Light rays $S_a$ and $S_b$ originating at these points, as shown in FIG. 1, are internally reflected by prism faces $a$ and $b$ at points A and B, respectively, toward the objective 6 which focuses them onto receiving surface PF at A' and B', respectively. These light rays undergo a double transposition so that the relative position of projections A' and B', with reference to the vertical axial plane of the objective, is the same as that of the originating points $A_o$ and $B_o$. In a similar manner, light rays $S_c$ and $S_d$ from points C and D of the document to be reproduced (FIG. 3), lying in a common axial plane such as the aforementioned vertical midplane, are internally reflected by prism 3 with double transposition in that prism and in objective 6 to project the images of these points at C' and D' on receiving surface PF in their original relative position. For the sake of simplicity, FIG. 3 shows an internal reflection at the ridge 17; the same applies, however, to any pair of coplanar light rays from points spaced in axial direction on the supporting surface P.

Thus, writing or other pictorial matter carried on sheets G is projected in laterally nonreversed form upon the photocathode PF of image tube 7.

The focal length of objective 6 and its distance from photocathode PF are so chosen that the picture on surface P is sharply focused upon the photcathode without the use of any supplemental lenses. For photographing more distant objects in front of the camera (i.e., to the left thereof as viewed in FIG. 3), the slide 1 is shifted to one of its alternate operating positions in which the lens 4 or the lens 5 is optically aligned with front opening 15 and objective 6. Supplemental lens 4 is used for closeups, i.e., for the taking of pictures at a range between limits L and L' of 1 and 2 meters, respectively; supplemental lens 5 can be used for greater distances beyond range limit L', up to infinity.

The side faces a and b of prism 3 are shown truncated at d and e to save space; the resulting flattened ends of the prism are optically ineffectual.

We claim:

1. In a television camera, in combination:
an image tube for converting optical images into electromagnetic signals;
a fixed objective optically aligned with said tube;
movable mounting means in front of said objective;
a miter prism on said mounting means having a base, a rear face proximal to said objective and perpendicular to the axis thereof, and a pair of symmetrically inclined side faces meeting at a ridge, the latter diverging forwardly from said rear face and sloping toward said base;
document-holding means forming a supporting surface parallel to and spaced from the axis of said objective, said base confronting said supporting surface and being parallel thereto in one operating position of said mounting means in which said ridge is intersected by an extension of said axis whereby pictorial matter on said supporting surface is projected in laterally nonreversed form upon a receiving surface of said image tube; and
supplemental lens means on said mounting means alignable with said objective in at least one other operating position thereof for the focusing of light rays from more remote objects upon said receiving surface.

2. The combination defined in claim 1 wherein said supplemental lens means includes a first lens for close-ups and a second lens for long-range shots.

3. The combination defined in claim 1, further comprising illuminating means for said supporting surface and switch means closable by said mounting means in said one operating position thereof to actuate said illuminating means.

4. The combination in claim 1 wherein said mounting means comprises a carriage slidably guided for displacement parallel to said supporting surface.

5. The combination defined in claim 4 wherein said carriage is provided with handle means facilitating manual displacement thereof.

6. The combination in claim 1, further comprising diaphragm means in said objective and stationary photoelectric control means for said diaphragm means adjacent said objective.

7. The combination defined in claim 1 wherein said side faces are mutually perpendicular and said ridge includes with said base an angle of 45°.

8. The combination defined in claim 1 wherein said supporting surface is horizontal and disposed beneath said objective.

* * * * *